United States Patent
Kim et al.

(10) Patent No.: US 12,194,938 B2
(45) Date of Patent: Jan. 14, 2025

(54) DEVICE AND METHOD FOR DETECTING REAR COLLISION OF VEHICLE

(71) Applicant: HYUNDAI MOBIS CO., LTD., Seoul (KR)

(72) Inventors: Nam Wook Kim, Yongin-si (KR); Dae Sung Lee, Yongin-si (KR); Ji Young Yoon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 236 days.

(21) Appl. No.: 18/067,616

(22) Filed: Dec. 16, 2022

(65) Prior Publication Data
US 2023/0234526 A1 Jul. 27, 2023

(30) Foreign Application Priority Data
Jan. 26, 2022 (KR) .................. 10-2022-0011255

(51) Int. Cl.
*B60R 21/01* (2006.01)
*B60N 2/427* (2006.01)
*B60R 21/0132* (2006.01)
*G01S 13/86* (2006.01)
*G01S 13/931* (2020.01)

(52) U.S. Cl.
CPC ........ *B60R 21/0132* (2013.01); *B60N 2/4279* (2013.01); *B60R 2021/01211* (2013.01); *G01S 13/862* (2013.01); *G01S 13/865* (2013.01); *G01S 2013/93272* (2020.01)

(58) Field of Classification Search
CPC ............ B60R 21/0132; B60R 21/0134; B60R 21/0136; B60R 2021/01211; B60R 2021/01252; B60R 19/205; B60N 2/02; B60N 2/4279; G01S 13/862; G01S 13/865; G01S 2013/93272; G01S 7/4808; G01S 17/86; G01S 17/87; G01S 17/931; B60W 30/08; B60W 40/02; B60W 2420/408; B60W 2420/54; B60W 2554/801; B60W 2554/802; B60W 2554/804
USPC .......................................... 701/39, 43, 45, 49
See application file for complete search history.

(56) References Cited

FOREIGN PATENT DOCUMENTS

| JP | 3837909 | * 10/2006 | ............ B60R 21/01 |
| JP | 3912163 | * 5/2007 | ............ B60R 21/00 |

\* cited by examiner

*Primary Examiner* — Hai H Huynh
(74) *Attorney, Agent, or Firm* — DLA Piper LLP US

(57) ABSTRACT

A device for detecting a rear collision of a vehicle, the device including a first sensor unit that is disposed on one side of a back of the vehicle and detects a target vehicle positioned behind the vehicle to generate first sensing data, a second sensor unit that is disposed on the other side of the back of the vehicle and detects the target vehicle to generate second sensing data, an ultrasonic sensor that is mounted on the back of the vehicle, and detects a proximity of the target vehicle to generate third sensing data, and a controller that determines a relative speed and a relative distance with the target vehicle using the first sensing data and the second sensing data, determines the proximity of the target vehicle using the third sensing data, and determines an output of a command of unfolding an airbag outwardly mounted on the back of the vehicle and an output of a command of controlling a vehicle headrest.

17 Claims, 9 Drawing Sheets

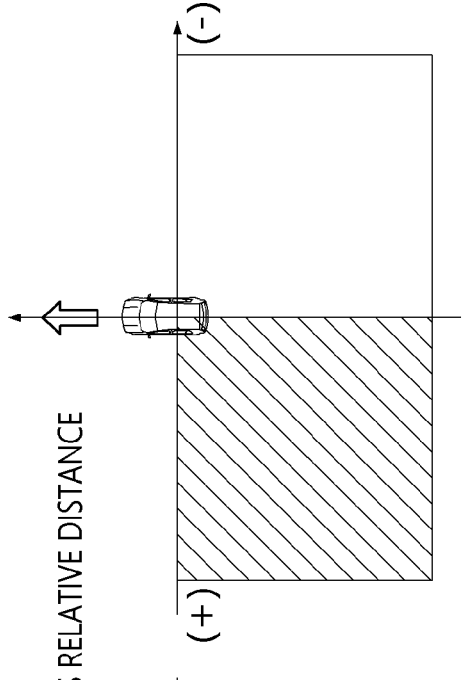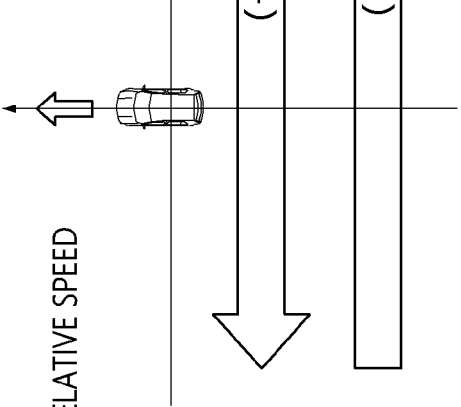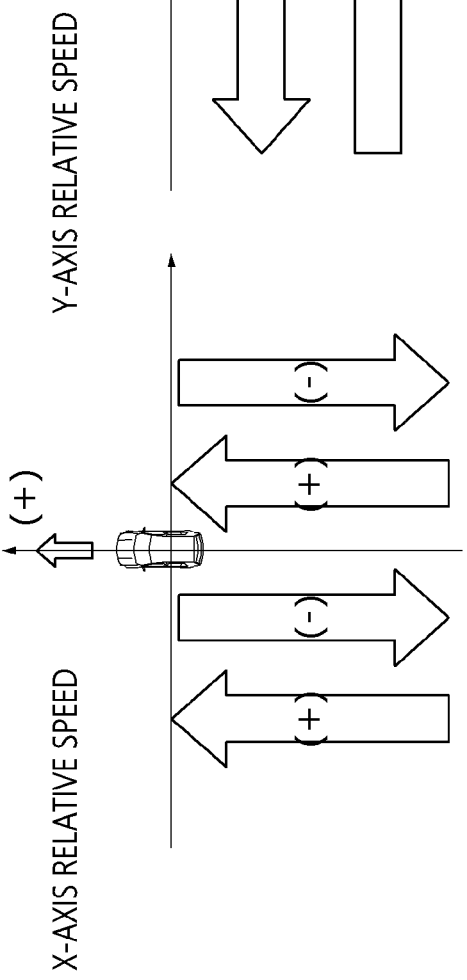

DEVICE AND METHOD FOR DETECTING REAR COLLISION OF VEHICLE

CROSS-REFERENCE TO RELATED APPLICATION

This application claims priority to and the benefit of Korean Patent Application No. 10-2022-0011255 filed on Jan. 26, 2022, the disclosure of which is incorporated herein by reference in its entirety.

BACKGROUND

Field of the Invention

The present disclosure relates to a device and method for detecting a rear collision of a vehicle.

Discussion of Related Art

There are many cases in which occupants are seriously injured or killed due to accidents caused by collisions that occur in vehicles. In response to this, airbag systems developed so far have been mainly developed and utilized for front collision accidents, side collision accidents, and overturning accidents of the vehicles.

However, a technology which can protect inner occupants when a target vehicle approaches a host vehicle from the rear and thus a collision occurs unlike the case of the front collision accidents or the side surface collision accidents is currently very insufficient. Thus, a technology which can predict a collision with a vehicle or object positioned on a rear side and protect the inner occupants to reduce injuries of the occupants is required.

SUMMARY OF THE INVENTION

The present disclosure is directed to providing a device and method for detecting a rear collision of a vehicle, which can predict a collision occurring on a rear side of a vehicle and a collision time point thereof, absorb the amount of collision energy according to the occurrence of the collision, and thus minimize injuries of occupants inside the vehicle.

A device for detecting a rear collision of a vehicle includes a first sensor unit that is disposed on one side of a back of a vehicle and detects a target vehicle positioned behind the vehicle to generate first sensing data, a second sensor unit that is disposed on the other side of the back of the vehicle and detects the target vehicle to generate second sensing data, an ultrasonic sensor that is mounted on the back of the vehicle, and detects proximity of the target vehicle to generate third sensing data, and a controller that determines a relative speed and a relative distance with the target vehicle using the first sensing data and the second sensing data, determines the proximity of the target vehicle using the third sensing data, and determines output of a command of unfolding an airbag outwardly mounted on the back of the vehicle and output of a command of controlling a vehicle headrest.

The first sensing data and the second sensing data may include relative coordinates and a relative speed of the target vehicle.

The ultrasonic sensor may be disposed between the first sensor unit and the second sensor unit.

When a longitudinal relative speed of the target vehicle exceeds a preset first longitudinal reference speed, and when a longitudinal relative distance and a transverse relative distance of the target vehicle are less than a preset first reference distance and a preset second reference distance, respectively, the controller may select the target vehicle as a danger target vehicle.

When the longitudinal relative speed of the danger target vehicle exceeds a preset second longitudinal reference speed, and a transverse relative speed of the danger target vehicle is less than a preset transverse reference speed, the controller may select the danger target vehicle as a collision target vehicle.

The controller may calculate a collision-expectation time with the collision target vehicle and output the command of unfolding the airbag and the command of controlling the vehicle headrest when the collision-expectation time is less than a preset reference time.

When the proximity is less than a preset reference proximity, the controller may stop the output of the command of unfolding the airbag and the command of controlling the vehicle headrest.

A method of detecting a rear collision of a vehicle includes generating first sensing data by detecting a target vehicle positioned behind a vehicle by a first sensor unit disposed on one side of a back of the vehicle, generating second sensing data by detecting the target vehicle positioned behind the vehicle by a second sensor unit disposed on the other side of the back of the vehicle, generating third sensing data by detecting proximity of the target vehicle by an ultrasonic sensor mounted on the back the vehicle, determining, by a controller, a relative speed and a relative distance to the target vehicle using the first sensing data and the second sensing data, determining the proximity of the target vehicle using the third sensing data, and determining, by the controller, output of a command of unfolding an airbag outwardly mounted on the back of the vehicle and output of a command of controlling a vehicle headrest according to the relative speed, the relative distance, and the proximity.

The first sensing data and the second sensing data may include relative coordinates and a relative speed of the target vehicle.

The determining may include selecting the target vehicle as a danger target vehicle when a longitudinal relative speed of the target vehicle exceeds a preset first longitudinal reference speed, and a longitudinal relative distance and a transverse relative distance of the target vehicle are less than a preset first reference distance and a preset second reference distance, respectively.

The determining may further include selecting the danger target vehicle as a collision target vehicle when a longitudinal relative speed of the danger target vehicle exceeds a preset second longitudinal reference speed and a transverse relative speed thereof is less than a preset transverse reference speed.

The determining may further include calculating a collision-expectation time with the collision target vehicle and outputting the command of unfolding the airbag and the command of controlling the vehicle headrest when the collision-expectation time is less than a preset reference time.

The determining may further include stopping the output of the command of unfolding the airbag and the command of controlling the vehicle headrest when the proximity is less than a preset reference proximity.

BRIEF DESCRIPTION OF THE DRAWINGS

The above and other objects, features and advantages of the present disclosure will become more apparent to those of ordinary skill in the art by describing exemplary embodiments thereof in detail with reference to the accompanying drawings, in which:

FIGS. 2 to 4A-4D are views for describing a detection range of the device for detecting a rear collision of a vehicle according to the embodiment.

DETAILED DESCRIPTION OF EXEMPLARY EMBODIMENTS

Figure 1:
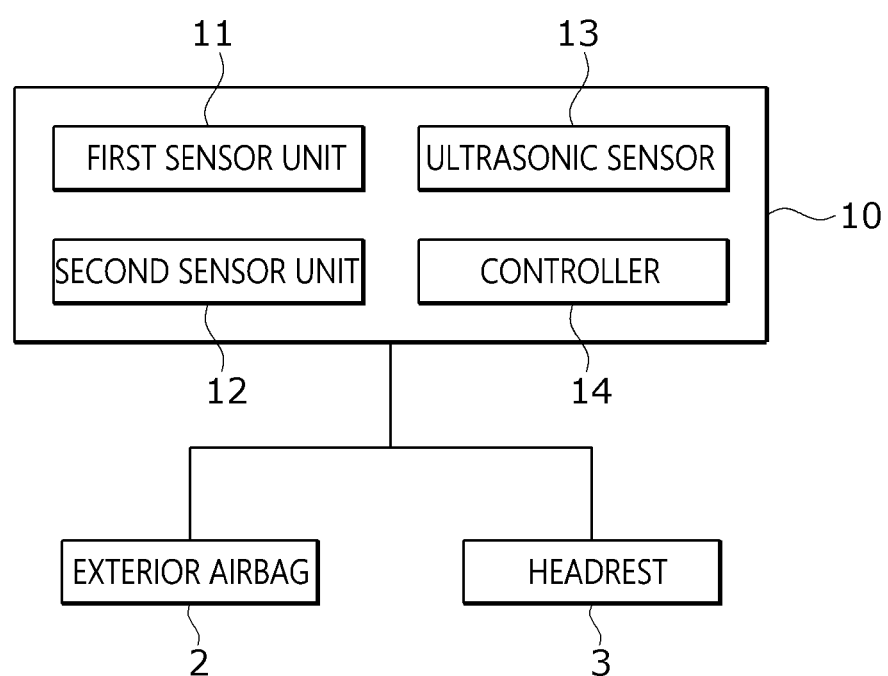
FIG. 1 is a block diagram illustrating a device for detecting a rear collision of a vehicle according to an embodiment.

Hereinafter, exemplary embodiments of the present disclosure will be described in detail with reference to the accompanying drawings.

However, the technical spirit of the present disclosure is not limited to some described embodiments, and may be implemented in various different forms, and one or more of components may be selectively combined or substituted between the embodiments within the scope of the technical spirit of the present disclosure.

Further, unless explicitly defined and described, terms (including technical and scientific terms) used in the embodiments of the present disclosure can be interpreted in a meaning that may be generally understood by those skilled in the art to which the present disclosure pertains. Terms generally used, such as terms defined in the dictionary, may be interpreted in consideration of the meaning of the context of the related technology.

Further, terms used in the embodiments of the present disclosure are for describing the embodiments and are not intended to limit the present disclosure.

In the present specification, a singular form may include a plural form unless specifically mentioned in a phrase, and when "at least one (or one or more) of A, B, and C" is described, one or more of all combinations that may be combined with A, B, and C may be included.

Further, in the description of the components of the embodiments of the present disclosure, the terms such as first, second, A, B, (a) and (b) may be used.

These terms are not used to delimit an essence, an order or sequence, and the like of a corresponding component but used merely to distinguish the corresponding component from other component(s).

Further, when it is described that a first component is "connected" or "coupled" to a second component, the first component may be "connected" or "coupled" to the second component with a third component therebetween as well as the first component may be directly connected or coupled to the second component.

Further, when it is described that a first component is formed or disposed "above" or "below" a second component, the terms "above" and "below" include that one or more third components may be formed or arranged between the first and second components as well as the first and second components may be in direct contact with each other. Further, when the "above or below" is expressed, the "above or below" may include the meanings of a downward direction as well as an upward direction based on one component.

Hereinafter, embodiments will be described in detail with reference to the accompanying drawings, the same or corresponding components are designated by the same reference numerals regardless of the reference numerals, and the duplicated description thereof will be omitted.

FIG. 1 is a block diagram illustrating a device for detecting a rear collision of a vehicle according to an embodiment, and FIGS. 2 to 4A-4D are views for describing a detection range of the device for detecting a rear collision of a vehicle according to the embodiment.

Referring to FIGS. 1 to 4A-4D, a device 10 for detecting a rear collision of a vehicle may include a first sensor unit 11, a second sensor unit 12, an ultraviolet sensor unit 13, and a controller 14.

Figure 2:
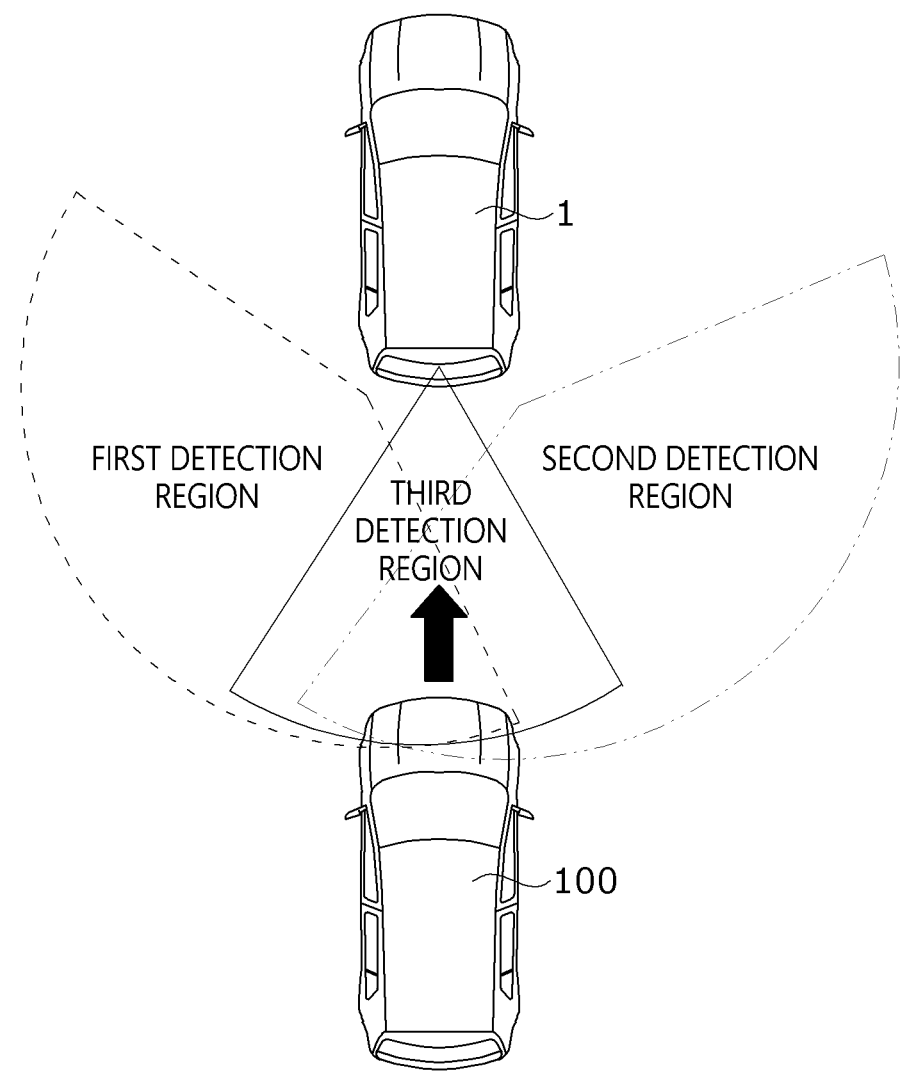

The first sensor unit 11 may be disposed on one side of a back of a vehicle and detect a target vehicle positioned behind the vehicle to generate first sensing data. The first sensor unit 11 may include a radar sensor or a LiDAR (Light Detection and Ranging) sensor. For example, as illustrated in FIG. 2, the first sensor unit 11 may be disposed adjacent to a left side mirror that sees behind the vehicle, detect a first detection region of a sectoral region, and detect a target vehicle 100 positioned on a left side behind the vehicle.

The first sensor unit 11 may control a phase shifter to adjust a horizontal scanning range and direction. The first sensor unit 11 may detect relative coordinates and a relative distance with respect to the target vehicle 100 positioned in a detection direction using a speed of and a time difference between transmission radio waves and reception radio waves. The first sensing data may include an identification (ID) number of the target vehicle, an X-axis relative coordinate of the target vehicle, a Y-axis relative coordinate of the target vehicle, an X-axis relative speed of the target vehicle, and a Y-axis relative speed of the target vehicle. In the embodiment, an X-axis may mean a longitudinal axis of the vehicle, that is, the same axis as a traveling direction, and a Y-axis may mean a transverse axis perpendicular to the X-axis.

Accordingly, as illustrated in FIG. 4A, based on a central portion of the vehicle in the longitudinal direction, an X-axis relative coordinate of a target vehicle positioned in front of the vehicle may have a positive value, and an X-axis relative coordinate of a target vehicle positioned behind the vehicle may have a negative value.

Further, as illustrated in FIG. 4B, based on a central portion of the vehicle in the width direction, a Y-axis relative coordinate of a target vehicle positioned on a right side of the vehicle may have a positive value, and a Y-axis relative coordinate of a target vehicle positioned on a left side of the vehicle may have a negative value.

Further, as illustrated in FIG. 4C, an X-axis relative speed of a target vehicle approaching a rear side of the vehicle may have a positive value, and an X-axis relative speed of a target vehicle moving away from the rear side of the vehicle may have a negative value.

Further, as illustrated in FIG. 4D, a Y-axis relative speed of a target vehicle approaching a lateral side of the vehicle may have a positive value, and a Y-axis relative speed of a target vehicle moving outward from the lateral side of the vehicle may have a negative value.

The first sensing data may be transmitted to the controller 14 through controller area network (CAN) communication.

The second sensor unit 12 may be disposed on the other side of the back of the vehicle and detect the target vehicle 100 positioned behind the vehicle to generate second sensing data. The second sensor unit 12 may include a radar sensor or a LiDAR sensor. For example, as illustrated in FIG. 2, the second sensor unit 12 may be disposed adjacent to a right side mirror that sees behind the vehicle, detect a second detection region of a sectoral region, and detect a target vehicle 100 positioned on a right side behind the vehicle.

The second sensor unit 12 may control the phase shifter to adjust a horizontal scanning range and direction. The second sensor unit 12 may detect relative coordinates and a relative distance with respect to the target vehicle positioned in a detection direction using the speed of and the time difference between the transmission radio waves and the reception radio waves. The second sensing data may include an ID number of the target vehicle, an X-axis relative coordinate of the target vehicle, a Y-axis relative coordinate of the target vehicle, an X-axis relative speed of the target vehicle, and a Y-axis relative speed of the target vehicle.

The second sensing data may be transmitted to the controller 14 through CAN communication.

The ultrasonic sensor 13 may be mounted on the back of the vehicle and detect approach of the target vehicle to generate third sensing data. The ultrasonic sensor 13 may generate the third sensing data by detecting an absolute distance between the target vehicle 100 and a rear side of the host vehicle 1.

Figure 3:
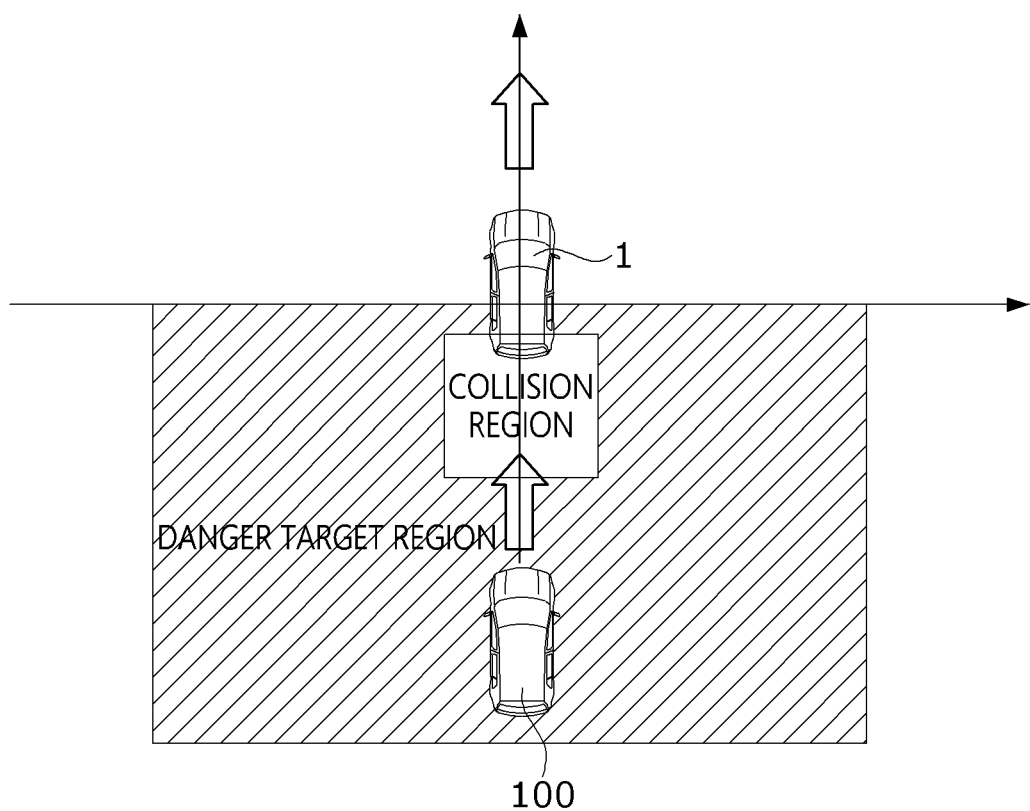

The ultrasonic sensor 13 may be disposed between the first sensor unit 11 and the second sensor unit 12, and as illustrated in FIG. 2, may detect a third detection region in which the detection regions of the first sensor unit 11 and the second sensor unit 12 partially overlap each other. Therefore, as illustrated in FIG. 3, a position of the target vehicle 100, at which it is determined on the basis of the first and second sensing data that a collision risk is present, may be defined as a danger region.

Further, a collision-predictable position of the target vehicle, which is determined on the basis of the first to third sensing data, may be defined as a collision region.

That is, a device for detecting a rear collision of a vehicle according to the embodiment can determine whether a rear collision of a vehicle may occur using the sensing data obtained by detecting detection regions of the first sensor unit 11, the second sensor unit 12, and the ultrasonic sensor 13, and as a result, can predict a rear collision and a collision time point on the basis of a collision region in which the detection regions of the first sensor unit 11, the second sensor unit 12, and the ultrasonic sensor 13 overlap.

The third sensing data may be transmitted to the controller 14 through CAN communication.

The controller 14 can determine a relative speed and a relative distance to the target vehicle 100 using the first sensing data and the second sensing data, determine a proximity of the target vehicle using the third sensing data, and determine an output of a command of unfolding an airbag 2 outwardly mounted on the rear side of the vehicle and output of a control command a vehicle headrest 3 on the basis of the relative speed, the relative distance, and the proximity.

In the embodiment, the controller 14 may be configured as an airbag control unit (ACU).

When a longitudinal relative speed of the target vehicle exceeds a preset first longitudinal reference speed, and a longitudinal relative distance and a transverse relative distance of the target vehicle are less than a preset first reference distance and a preset second reference distance, respectively, the controller 140 may select the target vehicle 100 as a dangerous target vehicle.

Further, when a longitudinal relative speed of the danger target vehicle exceeds a preset second longitudinal reference speed, and a transverse relative speed of the target vehicle is less than a preset transverse reference speed, the controller 14 may select the danger target vehicle as a collision target vehicle.

Further, the controller 14 may calculate a collision expectation time with the collision target vehicle and output a command of unfolding the airbag 2 and a command of controlling a vehicle headrest 3 when the collision-expectation time is less than a preset reference time. In this case, when the proximity is less than a preset reference proximity, the controller 14 may stop the command of unfolding the airbag 2 and the command of controlling the vehicle headrest 3.

The airbag may be outwardly mounted on the rear side of the vehicle and prevent a direct collision with the target vehicle, and the headrest can minimize a neck injury of the occupant by being adjusted to an optimum position in consideration of a collision speed and direction with the target vehicle.

The controller 14 may independently adjust an angle and a direction of the headrest.

The controller 14 may determine an adjustment angle of the headrest according to a longitudinal relative speed and a transverse relative speed of the collision target vehicle. For example, the controller 14 may increase a front-rear adjustment angle of the headrest as the longitudinal relative speed of the collision target vehicle becomes greater, that is, a speed at which the collision target vehicle approaches a host vehicle becomes greater. Further, the controller 14 may increase the left-right adjustment angle of the headrest as the transverse relative speed of the collision target vehicle becomes greater, that is, a force applied by the collision target vehicle to the rear side of the vehicle becomes greater.

Further, the controller 14 may determine an adjustment direction of the headrest according to the transverse relative speed of the collision target vehicle. For example, when it is expected that the collision target vehicle collides with a rear left surface of the host vehicle, the controller 14 may control the headrest such that the headrest rotates in a clockwise direction. Further, when it is expected that the collision target vehicle collides with a rear right surface of the host vehicle, the controller 14 may control the headrest such that the headrest rotates in a counterclockwise direction.

Therefore, the amount of impact applied to the occupant can be minimized by controlling the headrest according to the amount of impact and a direction of a force applied to the host vehicle by the collision target vehicle.

FIGS. 5 to 10 are views for describing an operation of the device for detecting a rear collision of a vehicle according to the embodiment.

Figure 5:
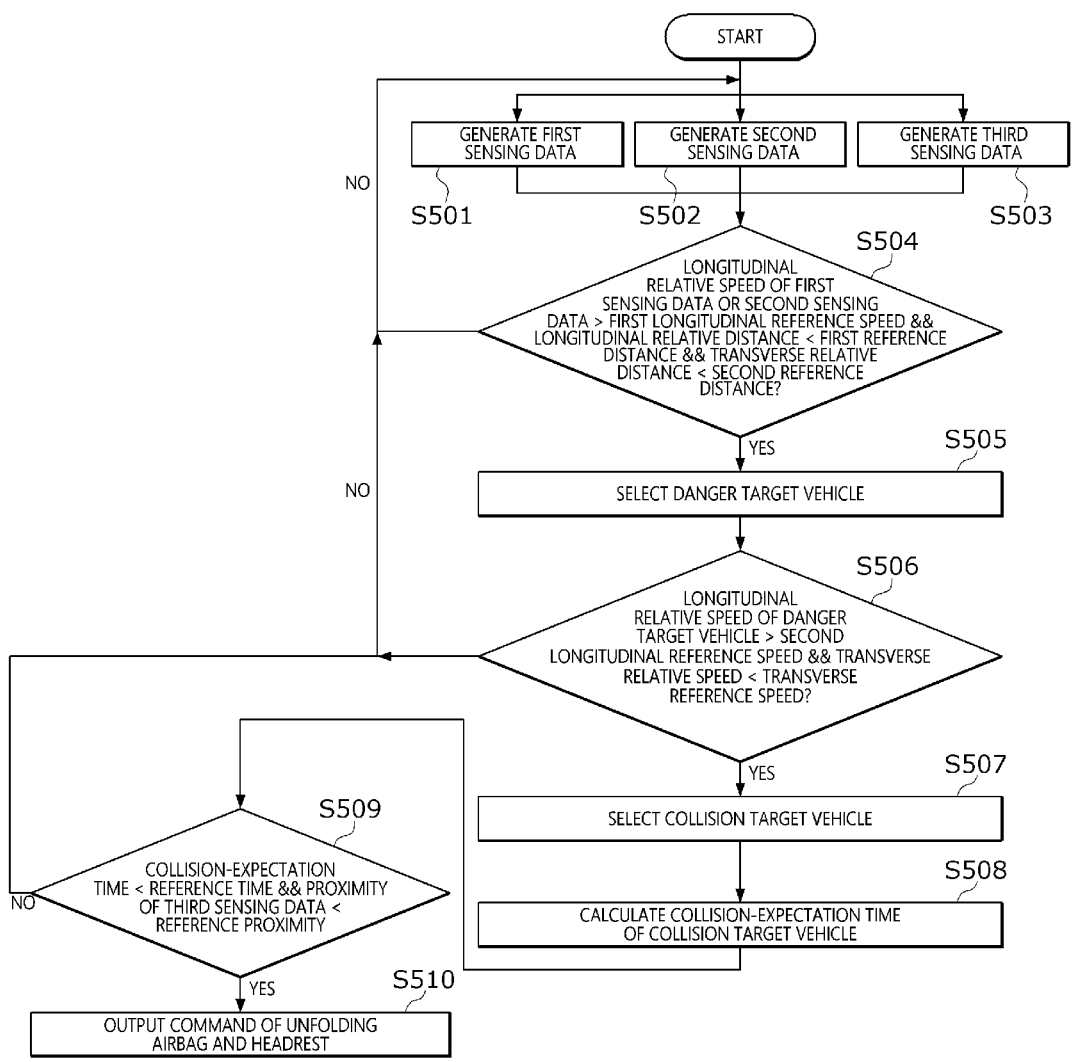
FIGS. 5 to 10 are views for describing an operation of the device for detecting a rear collision of a vehicle according to the embodiment.

Referring to FIG. 5, first, a first sensor unit generates first sensing data by detecting a target vehicle positioned in a first detection region behind a vehicle (S501).

At the same time, a second sensor unit generates second sensing data by detecting a target vehicle positioned in a second detection region behind the vehicle (S502).

At the same time, an ultrasonic sensor unit generates third sensing data by detecting proximity of a target vehicle positioned in a third detection region behind the vehicle (S503).

The ID number for the same target vehicle is added to the first sensing data, the second sensing data, and the third sensing data, and the first sensing data, the second sensing data, and the third sensing data are transmitted to a controller.

Figure 6:
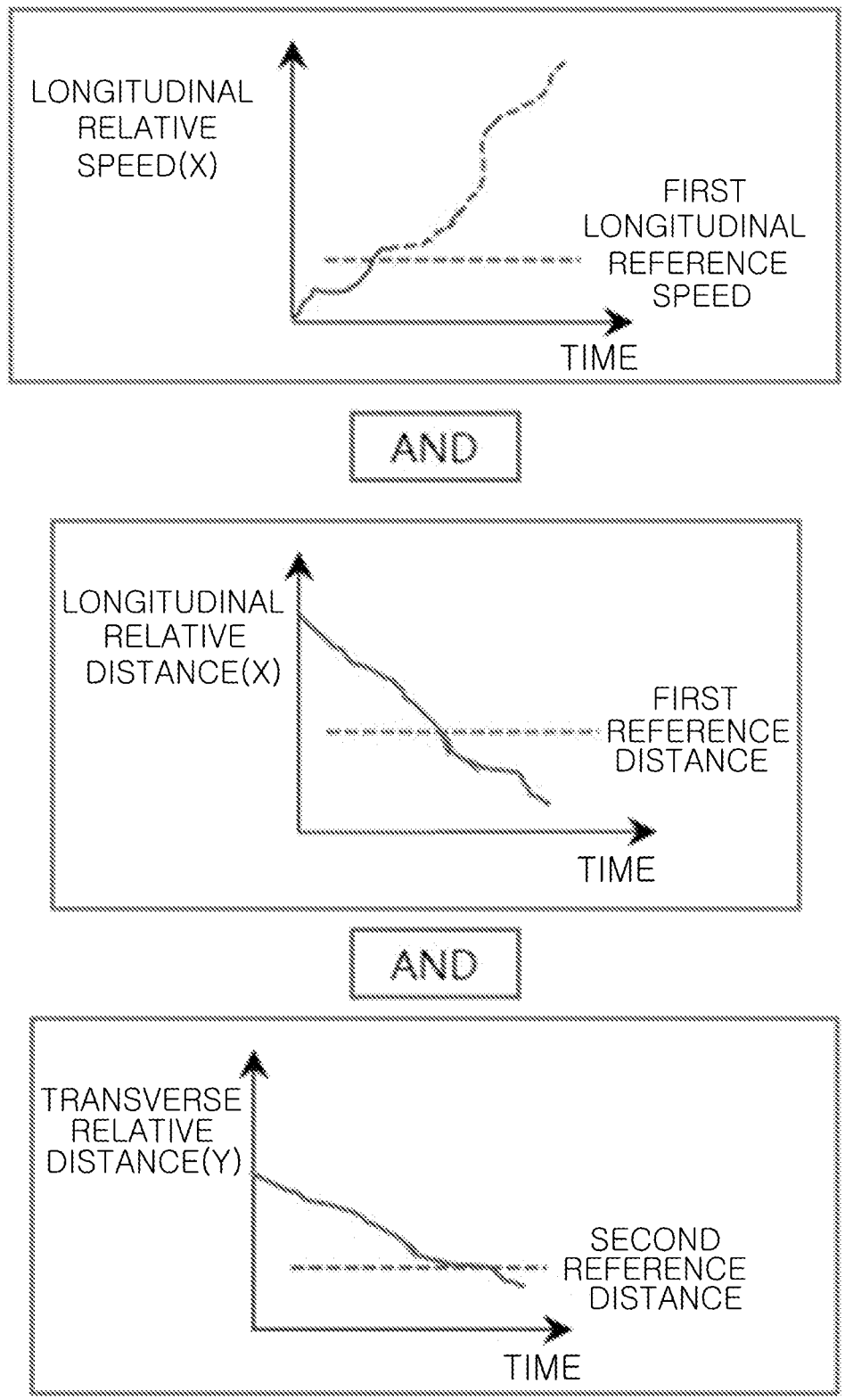

Next, the controller selects the target vehicle as the danger target vehicle using the first sensing data and the second sensing data when the longitudinal relative speed of the target vehicle positioned in the first detection region and the second detection region exceeds the preset first longitudinal reference speed and the longitudinal relative distance and the transverse relative distance of the target vehicle are less than the preset first reference distance and the second reference distance. That is, as illustrated in FIG. 6, when the longitudinal relative speed, the longitudinal relative distance, and the transverse relative distance of the first sensing data satisfy the above conditions or the longitudinal relative speed, the longitudinal relative distance, and the transverse relative distance of the second sensing data satisfy the above conditions, the target vehicle is selected as the danger target vehicle (S504 to S505).

In the embodiment, the first longitudinal reference speed, the first reference distance, and the second reference distance may be set to have the same value with respect to the first sensing data and the second sensing data.

Figure 7:
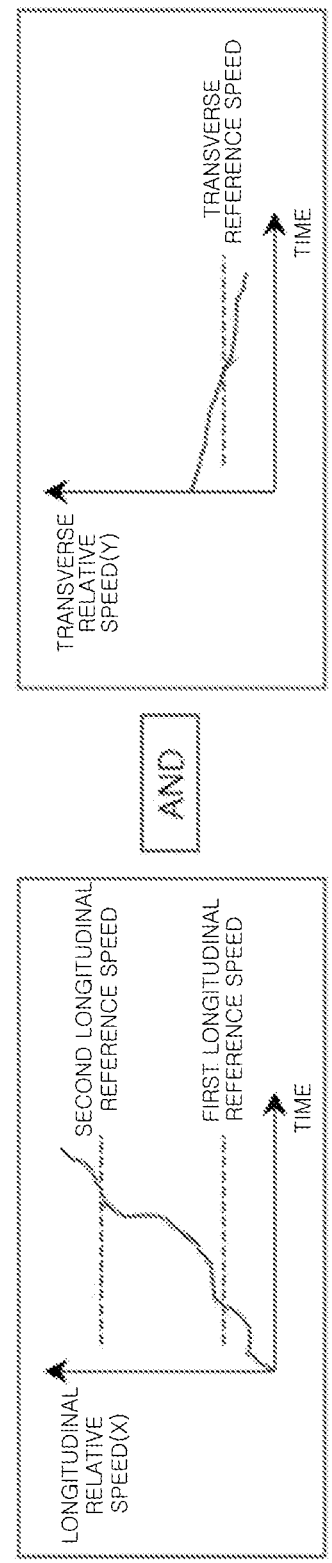

Next, when the longitudinal relative speed of the danger target vehicle exceeds the preset second longitudinal reference speed and the transverse relative speed is less than the preset transverse reference speed, the controller selects the danger target vehicle as a collision target vehicle using the first sensing data and the second sensing data. That is, as illustrated in FIG. 7, when the longitudinal relative speed and the transverse relative speed of the first sensing data satisfy the above conditions or the longitudinal relative speed and the transverse relative speed of the second sensing data satisfy the above conditions, the danger target vehicle is selected as the collision target vehicle (S506 to S507).

In the embodiment, the second longitudinal reference speed may be set to a value greater than the first longitudinal reference speed. Further, the second longitudinal reference speed and the transverse reference speed may be set to the same value for the first sensing data and the second sensing data.

That is, in the embodiment, the danger target vehicle may be selected when the longitudinal relative speed of at least one of the first sensing data and the second sensing data exceeds the first longitudinal reference speed and the longitudinal relative distance and the transverse relative distance of the target vehicle are less than the preset first reference distance and the preset second reference distance.

Further, the collision target vehicle may be selected when at least one longitudinal relative speed of the sensing data satisfying a collision target vehicle selection condition exceeds a preset second longitudinal reference speed, and the transverse relative speed is less than the preset transverse reference speed.

Next, the controller calculates the collision-expectation time with the collision target vehicle. For example, the controller may calculate the collision-expectation time according to [Equation 1] (S508).

$$TTC = \frac{Rel.Position}{Rel.Velocity} \quad [Equation\ 1]$$

In [Equation 1], TTC denotes a collision-expectation time with the collision target vehicle, Rel.Velocity denotes a relative speed with the collision target vehicle, and Rel.Position denotes a relative distance with the collision target vehicle. Rel.Velocity may be calculated as a composite value of a target vehicle X-axis relative speed and a target vehicle Y-axis relative speed of the first sensing data and the second sensing data. Further, Rel.Position may be calculated as a composite value of a target vehicle X-axis relative distance and a target vehicle Y-axis relative distance of the first sensing data and the second sensing data.

Figure 8:
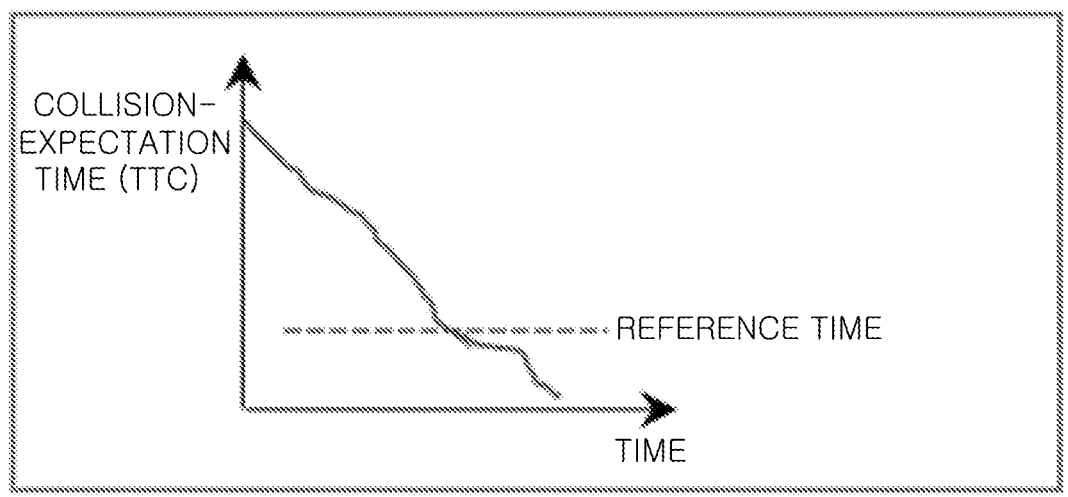
Figure 9:
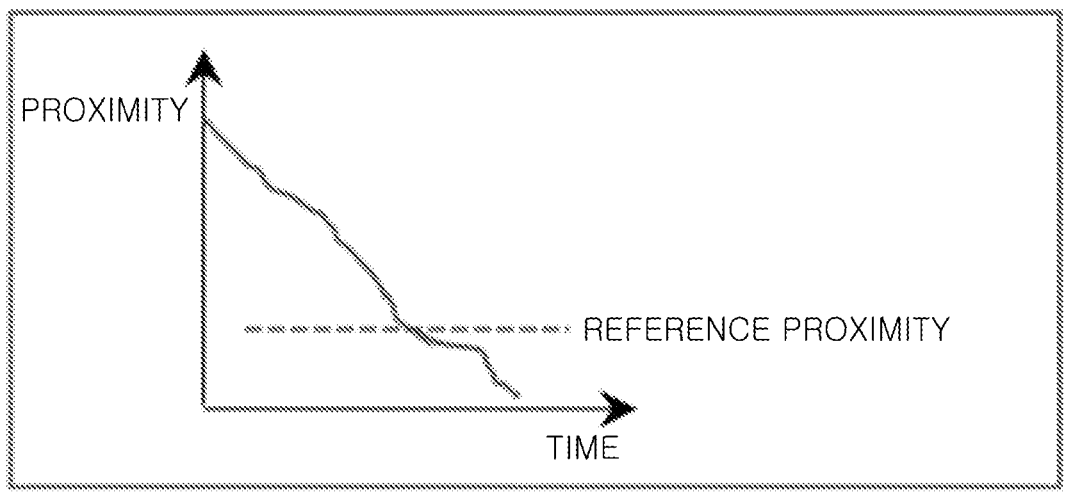

As illustrated in FIG. 8, when the collision-expectation time is less than the preset reference time, the controller may determine that the possibility of collision with the collision target vehicle is high and primarily determine the output of the command of unfolding the airbag and the command of controlling the vehicle headrest. In this case, as illustrated in FIG. 9, in order to improve reliability of a collision possibility determination, whether the proximity of the target vehicle is less than the preset reference proximity is additionally determined using the third sensing data (S509).

Figure 10:
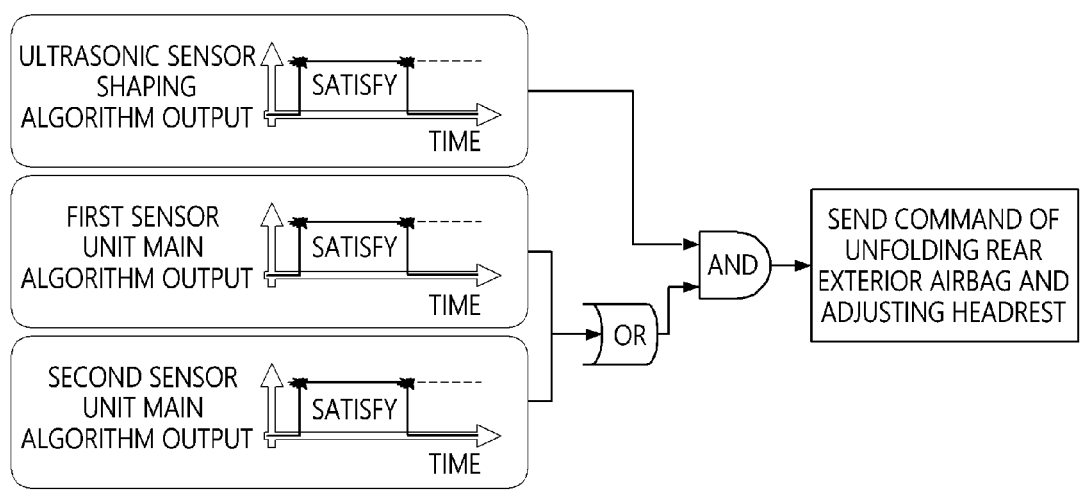

Next, as illustrated in FIG. 10, when the collision-expectation time of the collision target vehicle selected on the basis of at least one of the first sensing data and the second sensing data is less than the preset reference time, and when the proximity satisfies all conditions that is less than a preset reference proximity, the controller outputs the command of unfolding the airbag and the command of controlling the vehicle headrest. In this case, the airbag may be outwardly mounted on the rear side of the vehicle and thus prevent a direct collision with the target vehicle, and the headrest may minimize a neck injury of the occupant by being adjusted to an optimum position in consideration of a collision speed and direction with the target vehicle (S510).

The term "~unit" used in the present embodiment refers to software or hardware components such as a field-programmable gate array (FPGA) or an application specific integrated circuit (ASIC), and "~unit" performs certain roles. However, "~unit" is not limited to the software or the hardware. "~unit" may be present in an addressable storage medium or may refresh one or more processors. Thus, as an example, "~unit" includes components such as software components, object-oriented software components, class components, and task components and may include processes, functions, properties, procedures, sub-routines, segments of a program code, drivers, firmwares, microcodes, circuits, data, database, data structures, tables, arrays, and variables. Functions provided in the components and "~unit" may be combined into a smaller number of components and "~units" or may be further separated into additional components and "~units". In addition, the components and "~units" may be implemented to reproduce one or more central processing units (CPUs) in a device or a security multimedia card.

In a device and method for detecting a rear collision of a vehicle according to an embodiment, a collision that may occur behind a vehicle can be predicted, and a collision time point can be determined in advance.

Further, when rear collision accidents occur, the amount of impact transferred to an inner occupant can be minimized, thereby protecting the occupant.

Further, the present disclosure can actively cope with position diversification of a seat according to development of a vehicle autonomous driving technology.

Although the exemplary embodiments of the present disclosure have been described above, those skilled in the art may understand that the present disclosure may be variously modified and changed without departing from the spirit and scope of the present disclosure described in the appended claims.

What is claimed is:

1. A device for detecting a rear collision of a vehicle, the device comprising:
a first sensor unit that is disposed on one side of a back of the vehicle and adapted to detect a target vehicle positioned behind the vehicle to generate first sensing data;

a second sensor unit that is disposed on another side of the back of the vehicle and adapted to detect the target vehicle to generate second sensing data;
an ultrasonic sensor that is mounted on the back of the vehicle, and adapted to detect a proximity of the target vehicle to generate third sensing data; and
a controller adapted to determine a relative speed and a relative distance with the target vehicle using the first sensing data and the second sensing data, determine the proximity of the target vehicle using the third sensing data, and determine an output of a command for unfolding an airbag outwardly mounted on the back of the vehicle and an output of a command for controlling a vehicle headrest.

2. The device of claim 1, wherein the first sensing data and the second sensing data comprise relative coordinates and a relative speed of the target vehicle.

3. The device of claim 2, wherein the ultrasonic sensor is disposed between the first sensor unit and the second sensor unit.

4. The device of claim 2, wherein the controller is adapted to select the target vehicle as a danger target vehicle when a longitudinal relative speed of the target vehicle exceeds a preset first longitudinal reference speed and when a longitudinal relative distance and a transverse relative distance of the target vehicle are less than a preset first reference distance and a preset second reference distance, respectively.

5. The device of claim 4, wherein the controller is adapted to select the danger target vehicle as a collision target vehicle when the longitudinal relative speed of the danger target vehicle exceeds a preset second longitudinal reference speed, and a transverse relative speed of the danger target vehicle is less than a preset transverse reference speed.

6. The device of claim 5, wherein the controller is adapted to calculate a collision-expectation time with the collision target vehicle, and outputs the command for unfolding the airbag and the command for controlling the vehicle headrest when the collision-expectation time is less than a preset reference time.

7. The device of claim 6, wherein the controller is adapted to stop the output of the command of unfolding the airbag and the command of controlling the vehicle headrest when the proximity is less than a preset reference proximity.

8. The device of claim 5, wherein the controller is adapted to determine an adjustment angle of the headrest according to a longitudinal relative speed and a transverse relative speed of the collision target vehicle.

9. The device of claim 5, wherein the controller is adapted to determine an adjustment direction of the headrest according to a transverse relative distance of the collision target vehicle.

10. A method of detecting a rear collision of a vehicle, the method comprising:
generating first sensing data by detecting a target vehicle positioned behind the vehicle by a first sensor unit disposed on one side of a back of the vehicle;
generating second sensing data by detecting the target vehicle positioned behind the vehicle by a second sensor unit disposed on another side of the back of the vehicle;
generating third sensing data by detecting a proximity of the target vehicle by an ultrasonic sensor mounted on the back of the vehicle;
determining, by a controller, a relative speed and a relative distance with the target vehicle using the first sensing data and the second sensing data;
determining, by the controller, the proximity of the target vehicle using the third sensing data; and
determining, by the controller, an output of a command for unfolding an airbag outwardly mounted on the back of the vehicle and an output of a command for controlling a vehicle headrest according to the relative speed, the relative distance, and the proximity.

11. The method of claim 10, wherein the first sensing data and the second sensing data include relative coordinates and a relative speed with the target vehicle.

12. The method of claim 11, wherein the determining comprises:
selecting the target vehicle as a danger target vehicle when a longitudinal relative speed of the target vehicle exceeds a preset first longitudinal reference speed, and a longitudinal relative distance and a transverse relative distance of the target vehicle are less than a preset first reference distance and a preset second reference distance, respectively.

13. The method of claim 12, wherein the determining further comprises:
selecting the danger target vehicle as a collision target vehicle when a longitudinal relative speed of the danger target vehicle exceeds a preset second longitudinal reference speed and a transverse relative speed thereof is less than a preset transverse reference speed.

14. The method of claim 13, wherein the determining further comprises:
calculating a collision-expectation time with the collision target vehicle; and
outputting the command for unfolding the airbag and the command for controlling the vehicle headrest when the collision-expectation time is less than a preset reference time.

15. The method of claim 14, wherein the determining further comprises:
stopping the output of the command for unfolding the airbag and the command for controlling the vehicle headrest when the proximity is less than a preset reference proximity.

16. The method of claim 13, wherein the determining further comprises:
determining an adjustment angle of the headrest according to the longitudinal relative speed and the transverse relative speed of the collision target vehicle.

17. The method of claim 13, wherein the determining further comprises:
determining an adjustment direction of the headrest according to a transverse relative distance of the collision target vehicle.

* * * * *